(12) United States Patent
Rana et al.

(10) Patent No.: US 9,294,538 B1
(45) Date of Patent: Mar. 22, 2016

(54) DYNAMIC CONTENT INJECTION

(71) Applicant: Amazon Technologies, Inc., Reno, NV (US)

(72) Inventors: Rajesh Kumar Rana, Tamil Nadu (IN); Srinivasan Ramachandran, Tamil Nadu (IN); James M. Cook, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 310 days.

(21) Appl. No.: 13/765,400

(22) Filed: Feb. 12, 2013

(51) Int. Cl.
*G06F 15/16* (2006.01)
*H04L 29/08* (2006.01)
*G06F 9/455* (2006.01)
*G06F 11/36* (2006.01)
*G06F 17/30* (2006.01)
*G06F 9/445* (2006.01)
*G06F 17/22* (2006.01)

(52) U.S. Cl.
CPC ............ *H04L 67/02* (2013.01); *G06F 9/45529* (2013.01); *G06F 11/3672* (2013.01); *G06F 9/44526* (2013.01); *G06F 17/2247* (2013.01); *G06F 17/30861* (2013.01); *G06F 17/30899* (2013.01)

(58) Field of Classification Search
CPC .............. H04L 29/08072; H04L 29/06; H04L 29/0809; H04L 29/08117; H04L 61/69; H04L 67/02; G06F 17/30861; G06F 9/45529; G06F 11/3672; G06F 9/44526; G06F 17/30899; G06F 17/2247
USPC ........................................... 709/219; 715/234
See application file for complete search history.

(56) References Cited

U.S. PATENT DOCUMENTS

| 7,685,192 | B1* | 3/2010 | Scofield et al. ............... 707/709 |
| 2009/0164564 | A1* | 6/2009 | Willis ........................... 709/203 |
| 2010/0325615 | A1* | 12/2010 | Ramot .......................... 717/124 |
| 2011/0066614 | A1* | 3/2011 | Chowdhury et al. ......... 707/736 |
| 2012/0023395 | A1* | 1/2012 | Pieczul et al. ................ 715/234 |
| 2012/0090026 | A1* | 4/2012 | Andrews et al. ................ 726/22 |
| 2013/0091197 | A1* | 4/2013 | Bar-Zeev et al. ............ 709/203 |

* cited by examiner

*Primary Examiner* — Jungwon Chang
(74) *Attorney, Agent, or Firm* — Lee & Hayes, PLLC

(57) ABSTRACT

Some examples provide for dynamic content injection into a web application. A request may be made by a browser extension operating in a web browser for a list of one or more files from a file server, the one or more files including content to be injected into a web page operated by the web application. Upon receiving a response, the content of the one or more files may be injected into the web page operated by the web application.

24 Claims, 5 Drawing Sheets

DYNAMIC CONTENT INJECTION

BACKGROUND

Conventional static web browsing allows users to navigate between static web pages to view new content. Web applications execute within a browser window to allow for additional functionality, such as displaying a dynamic web page that loads new content updates without loading entirely new web pages. In such a case, as a user navigates within a dynamic web page, a web application causes a new view port or window to be viewable in order to display new content updates within the dynamic web page. Such operations may be performed by the use of scripting programming languages and/or other web development techniques.

Content may be injected into static and dynamic web pages, as well as into web applications in general. However, the instructions that perform the injection and operate within a web browser are unable to browse or scan the directory structure of the device upon which the browser is operating. As such, the injecting instructions are written with explicit identification of the files containing the content and/or the content that is to be injected and may not ascertain this information dynamically.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
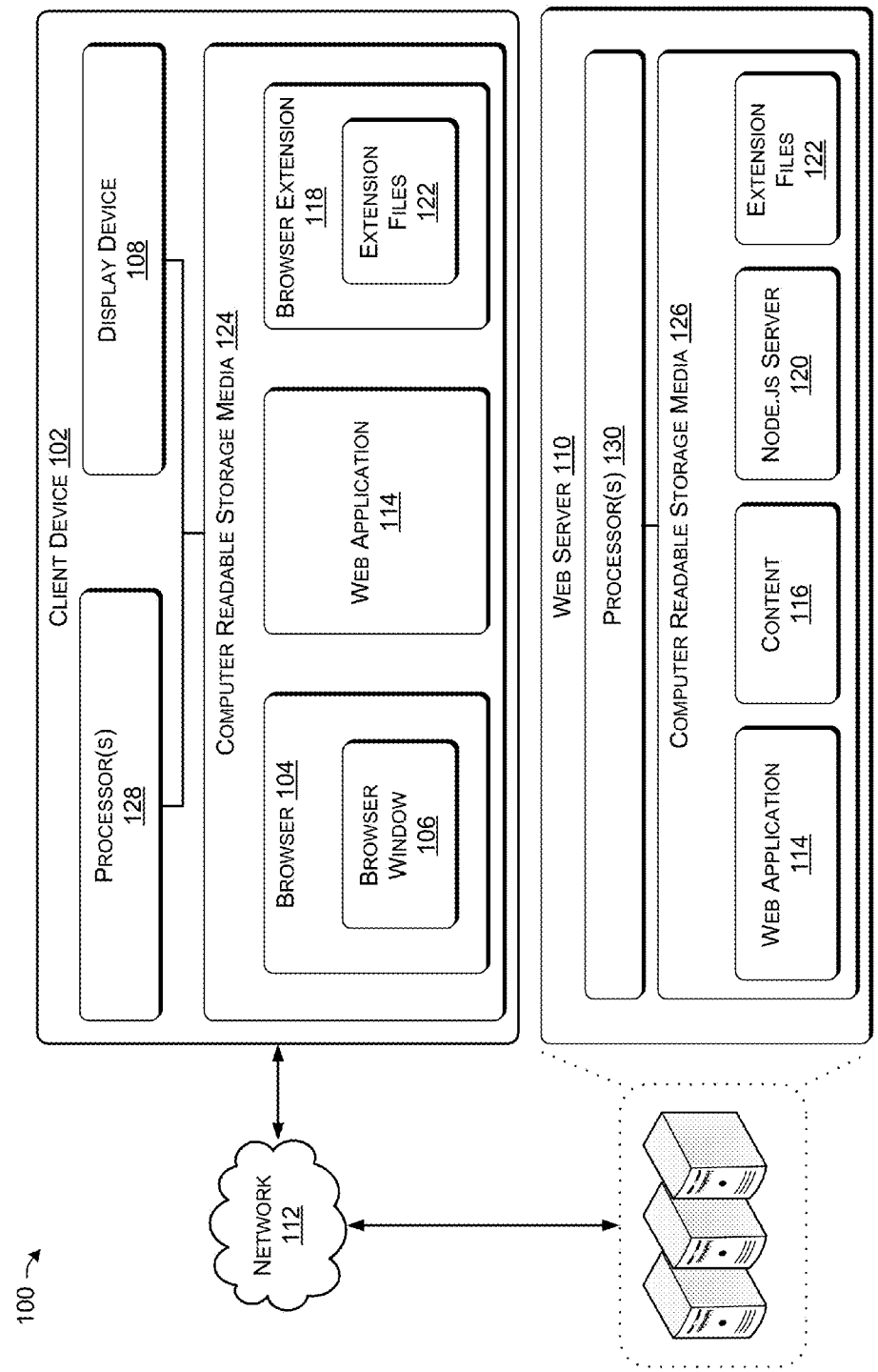
FIGS. 1 and 2 show environments for providing dynamic content injection into a web application.

Implementations of the present disclosure may facilitate dynamic injection of content, such as JavaScript instructions, into web pages and/or web applications, such as by and/or into browser extensions. Such dynamic injection may be performed where the injecting instructions have no explicit static identification of the content to be injected. The content may be injected into a web application, a dynamic web page operated by a web application, a static web page, and the like. In other implementations, a web application may inject the content into a part of the web application itself. The injecting instructions may obtain identification of the content to be injected by making a request to a file server that may provide filenames and/or locations of files containing the content or may provide the content to be injected directly. In some implementations, the file server may be a socket capable file server, such as a Node.js server. Upon receiving the request, the server may dynamically obtain and provide a list of files or the file contents to the injecting instructions. For example, the server may scan a directory or file structure and provide the files that are contained therein in response to the request. Upon receiving the response to the request, the injecting instructions may pull the files or the content of the files and inject the content into the web application, web page, etc.

In a particular example implementation, the injecting instructions may be included in a browser extension (a type of web application), such as an extension for the Chrome® brand browser, which may inject content into a dynamic web page operated by another web application. In such a case, the content may be JavaScript instructions. In such implementations, the browser extension may make a web request to the file server, which may be local or remote to the device executing the browser extension, to obtain at least one of filenames or file contents to the injected by the browser extension into the other web application. For example, in an implementation in which the file server is a Node.js server operating locally to the browser extension, the browser extension may request that a Node.js server scan the file structure of the browser extension on the local device and provide a list of files present therein. Such an implementation may be useful at least in the case of developing content (such as JavaScript scripts) for a browser extension. Upon receiving the list of files, the browser extension may load the content of the files and inject the content into the other web application. In particular, such an implementation may allow for the browser extension to be tested without the browser extension being re-coded each time a new file is added to or a file is renamed within the file structure of the browser extension. Of course, such a use is merely an example and is not meant to be a limitation and other uses are possible.

As used herein, a "dynamic web page" includes web pages with content that result from the execution of a web application, such as an asynchronous web application within a web view container of a native application—such as a browser or other application—designed to display content described at least partially in a markup language, such as HyperText Markup Language (HTML). The web application executes within a browser window to load content updates without loading new web pages. The web application may provide the appearance of loading new web pages, without actually doing so, by requesting and receiving content updates and displaying the updates within a new view port of view window of the browser window. Implementations include applications written according to one or more of the various Asynchronous JavaScript and XML (Ajax) technologies.

Although implementations are described herein with reference to "dynamic web pages," web applications (including browser extensions), Ajax technologies and the injection of scripts or instructions into web pages and/or web applications, this is for ease of description only. Implementations are not limited to the dynamic injection of scripts or other instructions into dynamic web pages and implementations are not limited to web applications and Ajax technologies. Other content types and technologies may be utilized without departing from the scope of the present disclosure.

The techniques and systems described herein may be implemented in a number of ways. Example implementations are provided below with reference to the following figures.

FIG. 1 shows an environment and system 100 for providing dynamic content injection into a web application. The client device 102 may be an end-user device such as a personal computer, smartphone, tablet computer, laptop computer, netbook, or any other device capable of displaying dynamic web pages. A browser 104 is configured to download web pages, including conventional and dynamic web pages, into a browser window 106 which are displayed on a display device 108. The web pages may be downloaded from a remote source, such as one or more web server(s) 110, over a network 112, which may include one or more of wireless networks, the public Internet, wide area networks, local area networks, or other network type. The display device 108 may be a computer monitor, liquid crystal display, plasma display, a touch-sensitive display, and the like. The web pages may implement a web store, a weblog, a social networking site, news source, and so forth.

The browser 104 may retrieve a web application 114 from the web server(s) 110. The web application 114 is configured to execute within the browser window 106 in order to implement a dynamic web page. The web application 114 may be an Ajax application, or other asynchronous or synchronous application type, configured to execute within a browser. The dynamic web page implemented by the web application 114 enables the user to navigate and interact with the dynamic web page.

For example, the web application 114 may receive data indicative of user interactions with the dynamic web page. The data may include one or more of mouse clicks, user taps or gestures on a touch-sensitive display, keyboard input, voice input, pointer data, and so forth.

The web application 114 may request updates of the content 116 from the web server(s) 110 based on the user interactions. For example, a user may select a link for a new view window of the dynamic web page. The content 116 for the new window may already be loaded onto the client device 102. If the content 116 for the new window has not been previously loaded on the client device, the web application 114 may issue a request to the web server(s) 110 for the content 116 for the new window based on the user interaction that makes a selection to view the content 116 for the new window.

In response, the web application 114 receives portions of the content 116 for the dynamic web page responsive to the requests previously made and the web application 114 may cause the received portions of content 116 to be displayed.

As such, in some implementations, upon selection of a hyperlink within the dynamic web page, the web application 114 is configured to alter the view port or window and display new content 116. From the user's perspective, it appears to behave in a manner that is similar to the behavior of a conventional static web site, which loads new web pages upon selection of browser hyperlinks.

In some implementations in which the web application 114 is an asynchronous web application, requests may be made for some portion of the content 116 from the web server(s) 110 without prohibiting the user from further interaction with the dynamic web page. Various techniques may be employed to avoid displaying out-of-order responses. It thus retrieves new content 116 for the dynamic web page without interfering with the display or functioning of the dynamic web page.

Browser extension 118 operates to inject content, such as JavaScript instructions, into the dynamic web page implemented by the web application 114. In particular, the browser extension 118 may operate to dynamically obtain identification of and/or the content to be injected into the dynamic web page implemented by the web application 114. In the implementation illustrated in FIG. 1, the browser extension 118 may interact with the Node.js server 120 to dynamically obtain the identification of and/or the content to be injected, such as extension files 122.

In some implementations, the extension files 122 are initially stored at and obtained from the web server(s) 110. In such implementations, the browser extension 118 may request a list of the extension files 122 be provided by the Node.js server 120. Upon receiving the list of the extension files 122, the browser extension 118 may pull or otherwise request the extension files 122 from the web server(s) 110. Upon receiving the extension files 122 from the Node.js server 120, the browser extension 118 may inject the contents of the extension files 122 into the dynamic web page implemented by the browser 104 in browser window 106.

In other implementations, the extension files 122 may be stored at the client device 102 without pulling the files 122 from the web server(s) 110. For example, the extension files 122 may already be present in the file structure of the browser extension 118. In such implementations, the browser extension 118 may query the Node.js server 120 to obtain the list of the extension files 122. The Node.js server 120 may obtain the list of extension files 122 by scanning the file structure of a copy of the extension files 122 which is local to the web server(s) 110. However, the Node.js server 120 may obtain a list of extension files 122 by various other techniques. For example, the list of extension files 122 may be statically stored on the Node.js server 120 and updated manually by a user each time the extension files 122 are modified. In response to receiving the list of extension files 122 from the Node.js server 120, the browser extension 118 may inject the contents of the extension files 122 from the file structure of the browser extension 118 into the dynamic web page implemented by the browser 104 in browser window 106.

In one example, the dynamic web page may implement a web store, and the web application 114 may receive data indicative of a user interaction requesting a details view of an item for sale. The browser extension 118 may inject content, such as scripts or other instructions, into the dynamic web page to provide additional and/or different functionality from the original page. This could, for example, allow for a developer of the web application 114 or of the browser extension 118 to test new scripts or other instructions without having to manually identify the extension files 122 each time a change is made.

Thus, the browser extension 118 is able to inject the content of extension files 122 by obtaining dynamic identification of the extension files 122 from the Node.js server 120 operating on the web server(s) 110.

In implementations, computer-readable storage media 126 and 128 may include volatile memory (such as RAM), non-volatile memory, removable memory, and/or non-removable memory, implemented in any method or technology for storage of information, such as computer-readable instructions, data structures, program modules, or other data. Also, the processor(s) 130 and 132 may include onboard memory in addition to or instead of the computer-readable storage media 126 and 128. Some examples of storage media that may be included in the computer-readable storage media 126 and 128 and/or within one or more of the processor(s) 130 and 132 include, but are not limited to, random access memory (RAM), read only memory (ROM), electrically erasable programmable read only memory (EEPROM), flash memory or other memory technology, compact disk (CD-ROM), digital versatile disks (DVD) or other optical storage, magnetic cassettes, magnetic tape, magnetic disk storage or other magnetic storage devices, other non-transitory computer storage media, or any other medium usable to store the desired information and that can be accessed by the client device 102 and/or the web server(s) 110. Any such computer-readable media may be part of the client device 102 and/or web server(s) 110.

The computer-readable storage media 126 and 128, meanwhile, may include software programs or other executable modules that may be executed by the processor(s) 130 and 132. Examples of such programs or modules include control modules (e.g., power management), network connection software, an operating system, sensor algorithms, and so forth. The computer-readable storage media 126 and 128 may also be used to store various databases.

Various processes, instructions, methods and techniques described herein may be considered in the general context of computer-executable instructions, such as program modules, that are executable by one or more computers or other devices. Generally, program modules include routines, programs, objects, components, data structures, etc. for performing particular tasks or implementing particular abstract data types. These program modules can be implemented as software modules that are executable on the processor(s) 130 and 132, as hardware, and/or as firmware. Typically, the functionality of the program modules may be combined or distributed as desired in various implementations. An implementation of these modules and techniques may be stored on some form of computer-readable media or transmitted across some form of computer-transmission media.

The modules stored in one or more of computer-readable storage media 126 and 128 may be implemented across one or more servers in a cloud computing environment, on a local device, or on a combination of both. Implementations do not limit the implementation of the modules stored in computer-readable storage media 126 and 128 to any particular device or environment.

Figure 2:
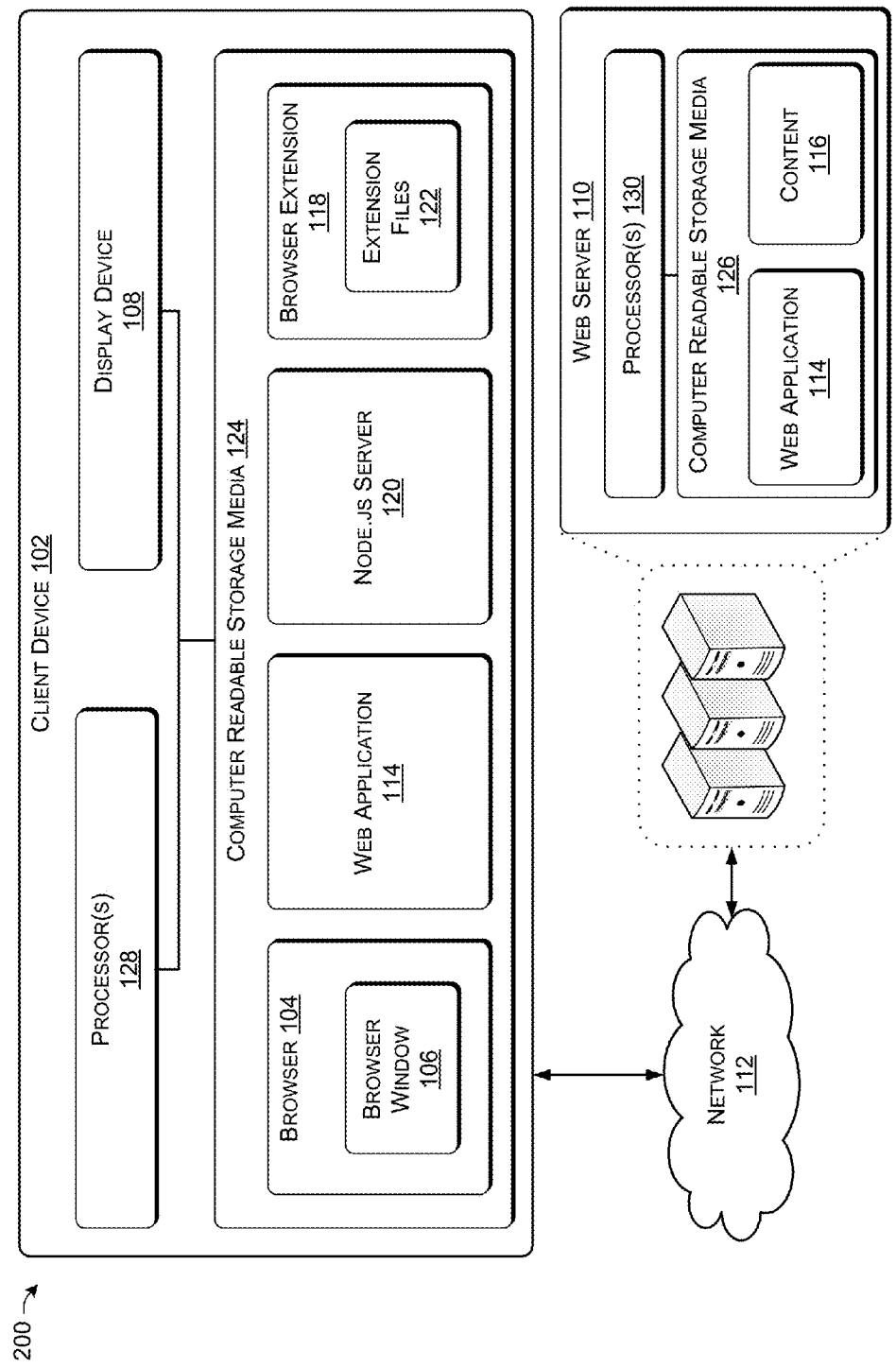

FIG. 2 shows another environment and system 200 for providing dynamic content injection into a web application. Specifically, FIG. 2 illustrates a modified implementation of that shown in FIG. 1. More particularly, FIG. 2 illustrates an implementation in which the Node.js server 120 is located at the client device 102 rather than on the web server(s) 110. For brevity, the discussion of FIG. 2 is limited to how the operation of the system 200 differs from that of the system 100.

In operation, the browser 104 of FIG. 2 may operate to load the web application 114 from the web server(s) 110. The browser extension 118 may execute instructions to inject content into a dynamic web page implemented by the web application 114 dynamically. As previously detailed, the browser extension 118 may not have prior identification of the content to be injected, such as content contained within extension files 122 in the file structure of the browser extension 118. To obtain identification of the content to be injected, the browser extension 118 may make a request to the Node.js server 120 operating on the client device 102. In response, the Node.js server 120 operating on the client device 102 may scan the file structure of the browser extension 118 and provide a list of the files located therein to the browser extension 118. The browser extension 118 may then load the extension files 122 and inject the content into the dynamic web page implemented by the web application 114.

Thus, the browser extension 118 is able to dynamically inject contents of extension files 122 by obtaining dynamic identification of the extension files 122 from the Node.js server 120 operating on the client device 102.

Although the example shown in FIGS. 1 and 2 is for dynamic injection of content into dynamic web pages implemented by web applications, implementations are not limited to these uses are discussed above. Further, while the Node.js server has been discussed as being executed by the web server(s) 110 or the client device 102, implementations are not so limited and the Node.js server may be executed by another device not shown in FIG. 1 or 2.

Figure 3:
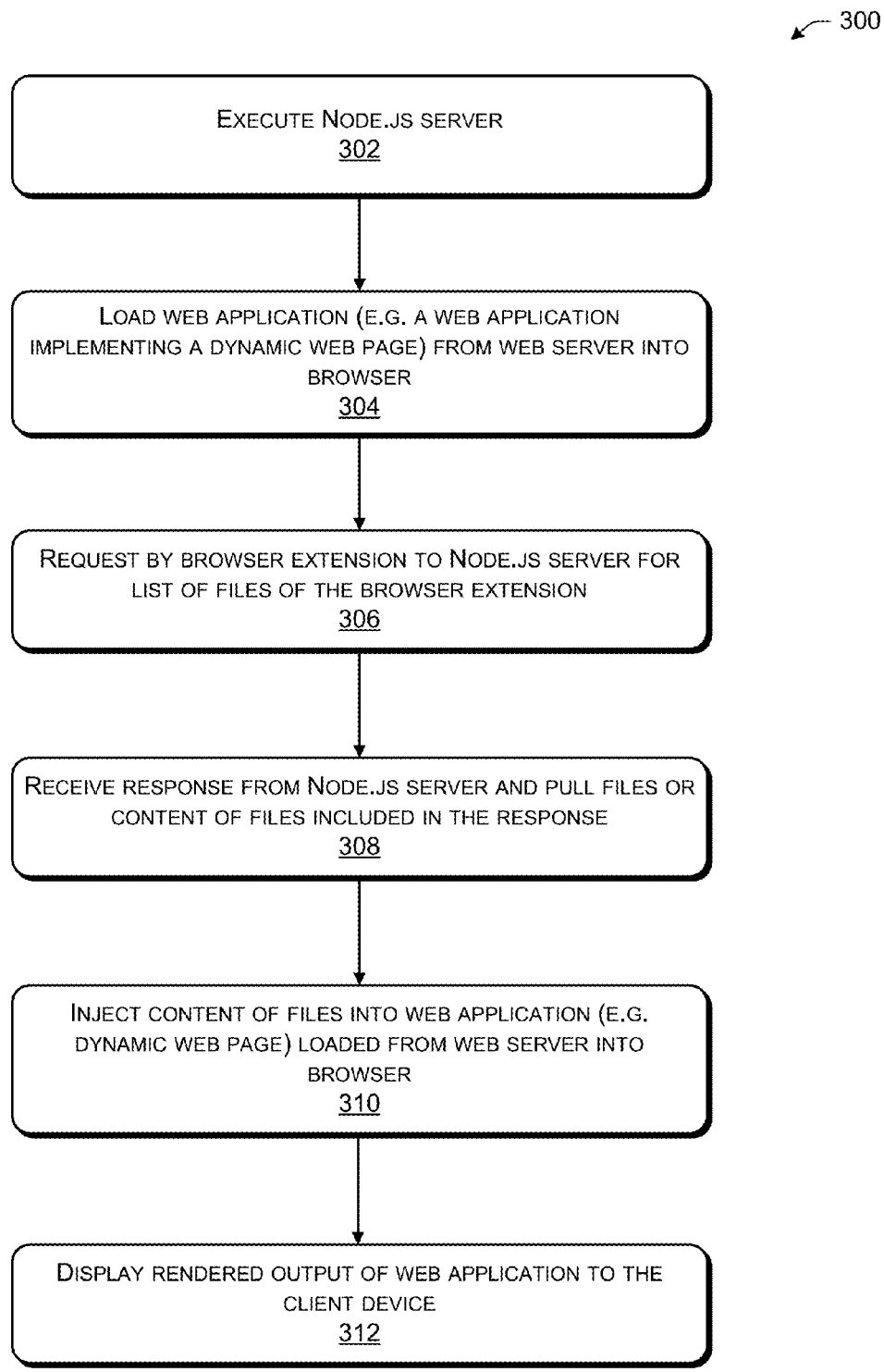
FIG. 3 shows an illustrative process for providing dynamic content injection into a web application.

FIG. 3 shows an illustrative process 300 for providing dynamic content injection into a web application. The process 300 is described with reference to the preceding figures, and specifically with reference to FIGS. 1 and 2. The process 300 is illustrated as a collection of blocks in a logical flow graph, which represent a sequence of operations that can be implemented in hardware, software, or a combination thereof. In the context of software, the blocks represent computer-executable instructions that are executable by one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Also, one or more of the described blocks may be omitted without departing from the scope of the present disclosure.

At 302, a Node.js server is executed. As discussed above, depending on the implementation, the Node.js server may be executed by the web server(s) 110, the client device 102, or another device.

At 304, a web application—such as the web application 114—is loaded from a web server to be executed within a browser window by a web browser. The web application may be retrieved from the web server, such as over the public Internet or other network. The web application may implement a dynamic web page. The web application may include an Asynchronous JavaScript and XML (Ajax) application.

At 306, the browser extension may make a request to the Node.js server for a list of files that include the content that is to be injected by the browser extension. As discussed above, the content may include instructions, such as JavaScript instructions, but implementations are not limited to such content. Further, the browser extension is not limited to making requests for the files but rather may make requests for the content itself. In response to the request, the Node.js server prepares the appropriate response and sends the response to the client device.

At 308, the browser extension receives the response from the Node.js server. As mentioned above, in some implementations, the response may include a list of files that contain the content that the browser extension is to inject into the web page. In other implementations, the response may include the content that is to be injected. Upon receiving the response from the Node.js server, the browser extension may pull the files listed in the response from the device where the files are located. As discussed with regard FIGS. 1 and 2, the files may be located at the client device where the browser extension is operating, the Node.js server or another device entirely.

At 310, the browser extension operates to inject the content of the files into the web application that was loaded from the web server(s) 110 into the browser (e.g., into the dynamic web page implemented by the web application).

At 312, the dynamic web page implemented by the web application is caused to be displayed within a browser window. Due to the content injected by the browser extension, the dynamic web page is rendered or otherwise operates based on the injected content as well as its original content.

The aforementioned techniques include a set of illustrative techniques for dynamically inject being content into a web application. However other techniques may be employed to accomplish similar results.

While the above examples shown in FIGS. 1-3 are discussed in the context of a web browser that executes a web application on a client device and a browser extension that interoperates with web servers to provide for dynamic injection of content into the web application, systems and techniques according to the current disclosure are not so limited. An example of another system and technique for implementing dynamic content injection is shown in FIGS. 4-5.

Figure 4:
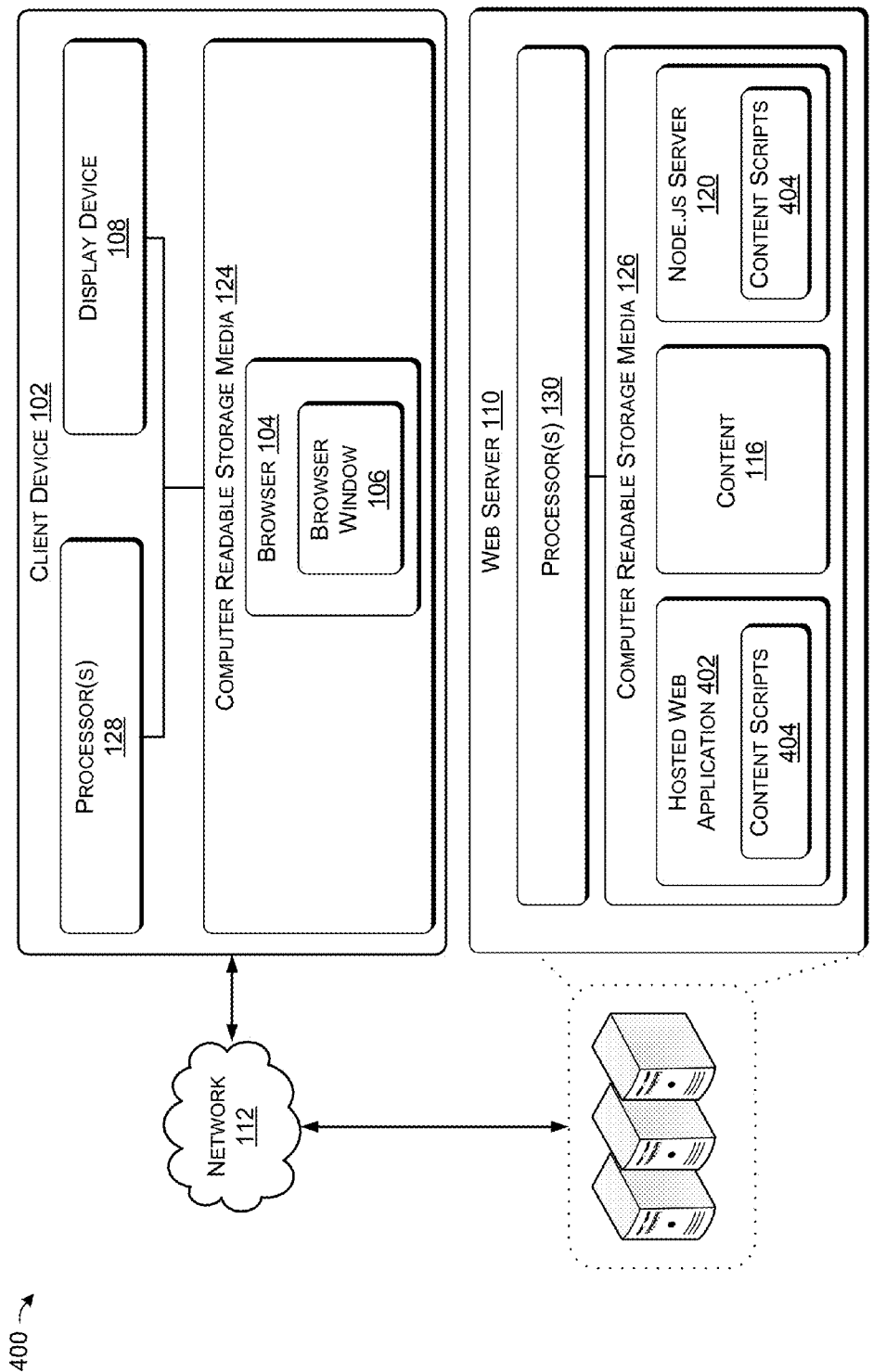
FIG. 4 shows an environment for providing dynamic content injection into a hosted web application.
Figure 5:
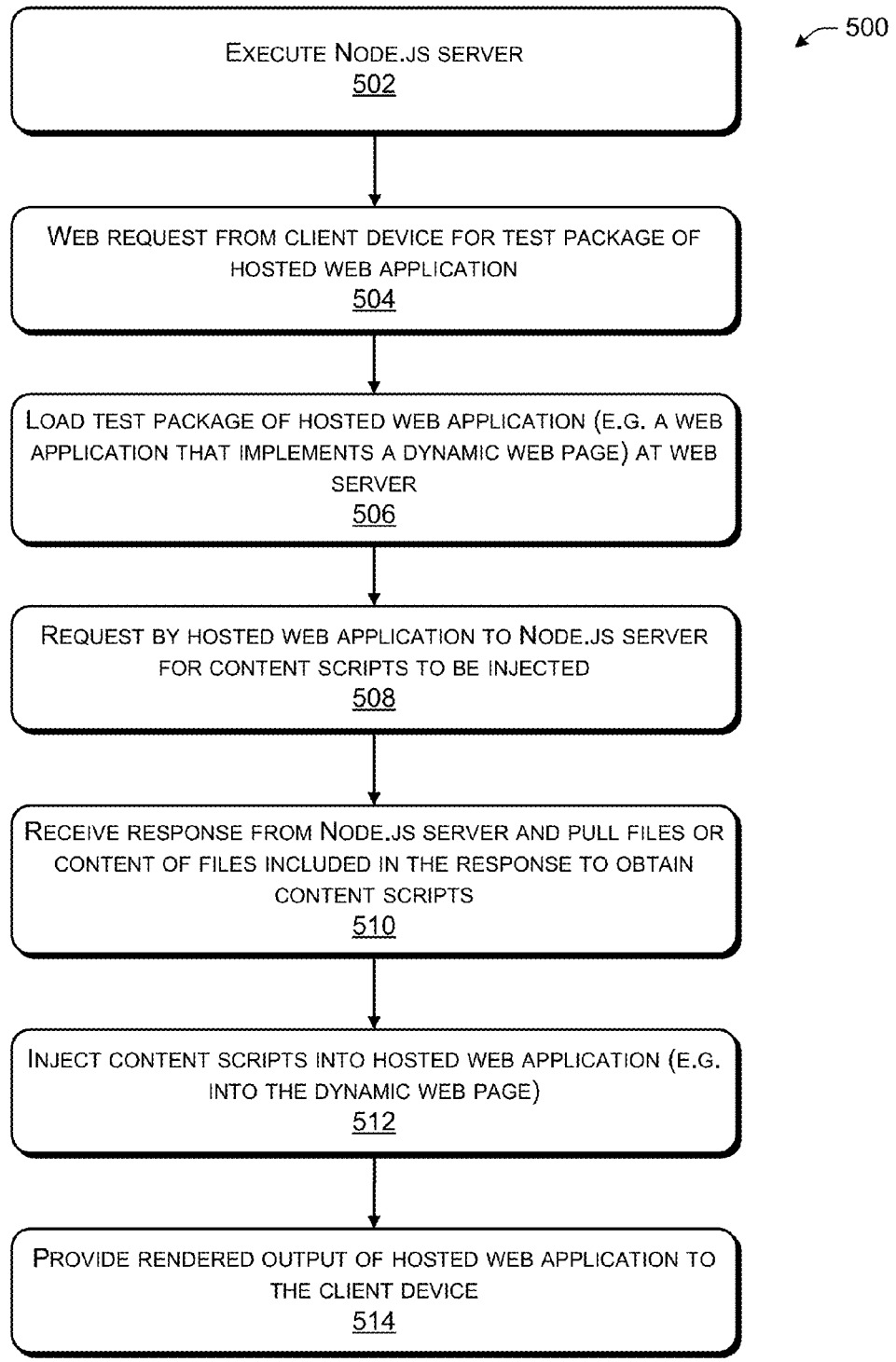
FIG. 5 shows an illustrative process for providing dynamic content injection into a hosted web application.

FIG. 4 shows an environment 400 for providing dynamic content injection into a hosted web application 402. In the implementation illustrated in FIG. 4, rather than the browser 104 loading the web application 114 and rendering the output of the dynamic web page, the web server(s) 110 execute the hosted web application 402 in a hosted mode to implement the dynamic web page based on the content 116. Browser 104 receives rendered output of the dynamic web page from the hosted web application 402 and displays the rendered output in a similar manner to that of displaying static web pages. In some implementations, the client device 102 of environment 400 may be a mobile device, such as a smartphone, tablet computer, laptop computer, netbook, or the like.

In the implementation shown in FIG. 4, the hosted web application 402 may execute content scripts 404. As with the browser extension 118, the hosted web application 402 is unable to dynamically determine files that contain content that may be injected into the dynamic web page implemented by the hosted web application 402. To allow for a dynamic determination, the hosted web application 402 makes a request to the Node.js server 120 in a similar manner to that discussed above with regard to browser extension 118. The Node.js server 120 may obtain content scripts 404 and/or the filenames of the files containing the content scripts 404 by scanning the computer readable storage medium 126. For example, the Node.js server 120 may scan the file structure of the hosted web application 402 on the computer readable storage medium 126 and obtain a list of the files stored therein and or the contents of the files. Thereupon, the Node.js server 120 may provide the information to the hosted web application 402. In implementations in which the web application 402 is provided a list of the files contain the content scripts 404, the hosted web application 402 may pull the content scripts 404 from the files.

Once the hosted web application 402 has obtained the content scripts 404, the hosted web application 402 may execute the content scripts 404 to provide additional and/or different functionality in the dynamic web page implemented by the hosted web application 402. Some examples of additional functionality that may be provided in some implementations may include finding unlinked URLs in web pages and converting them into hyperlinks, increasing or changing the font size to make text more legible, and/or finding and processing microformat data in the Document Object Model of the web page.

FIG. 5 shows an illustrative process 500 for providing dynamic content injection into a hosted web application. The process 500 is described with reference to the preceding figures, and specifically with reference to FIG. 4. To provide additional insight, the example process 500 shown in FIG. 5 is discussed in the context of a test package of a hosted web application into which content scripts are dynamically injected.

At 502, a Node.js server is executed. As discussed above, depending on the implementation, the Node.js server may be executed by the web server(s) 110, the client device 102 or another device.

At 504, a client device—such as the client device 102— makes a web request to web server(s) 110 for a URL of the test package of the hosted web application—such as the hosted web application 402. For example, the test package may include a version of the hosted web application that is being tested by a developer. The developer may include in the hosted web application instructions that cause the hosted web application to perform the functions described below (i.e. the functions of requesting and/or obtaining the content scripts and injecting them into the dynamic web page).

At 506, the test package of the hosted web application is loaded and executed by the web server(s). The test package of the hosted web application may be retrieved from another web server, such as over the public Internet or other network. The hosted web application may implement a dynamic web page. The hosted web application may include an Asynchronous JavaScript and XML (Ajax) application.

At 508, the hosted web application makes a request to the Node.js server for a list of files that include the content scripts that are to be injected into the dynamic web page. As discussed above, the example illustrated FIG. 5 includes content scripts that may be embodied as instructions, such as JavaScript instructions, but implementations are not limited to such content. Further, the hosted web application is not limited to making requests for the files but rather may make requests for the content scripts directly. In response to the request, the Node.js server prepares the appropriate response and sends the response to the hosted web application.

At 510, the host web application receives the response from the Node.js server. As mentioned above, in some implementations, the response may include a list of files that contain the content scripts that the hosted web application is to inject into the dynamic web page. In other implementations, the response may include the content scripts that are to be injected. Upon receiving the response from the Node.js server, the hosted web application may pull the files listed in the response from the device where the files are located. As discussed with regard FIG. 4, the files may be located at the web server(s) where the hosted web application is operating, the Node.js server, the client device, or another device.

At 512, the hosted web application operates to inject the content scripts into the dynamic web page implemented by the hosted web application. At 514, the dynamic web page implemented by the hosted web application is rendered into a static form and output to the client device 102. Upon receiving the rendered form of the dynamic web page, the client device 102 displays the web page within a browser window. Due to the content injected by the hosted web application, the dynamic web page is rendered or otherwise operates based on the injected content as well as its original content.

The aforementioned techniques include a set of illustrative techniques for dynamically inject being content into a web application. However other techniques may be employed to accomplish similar results.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. One or more non-transitory computer-readable media storing computer-executable instructions executable by one or more processors to cause the one or more processors to:
  execute a file server;
  load a web application into a web browser;
  request, by a browser extension operating in the web browser, a first file that includes content scripts to be included in a dynamic web page operated by the web application;
  instruct the file server to select the first file from a file structure;
  receive, by the browser extension, a response to the request, the response including the first file that includes the content scripts; and
  including, by the browser extension, at least part of the content scripts of the first file in the dynamic web page.

2. The one or more non-transitory computer-readable media of claim 1, wherein the file server communicates with the browser extension through a socket protocol.

3. The one or more non-transitory computer-readable media of claim 1, wherein the file server comprises a Node.js server.

4. The one or more non-transitory computer-readable media of claim 1, wherein the computer-executable instructions are further executable to:
  analyze, by the file server, the file structure, wherein the file structure is included in the browser extension.

5. The one or more non-transitory computer-readable media of claim 1, wherein the computer-executable instructions are further executable:
  pull, by the browser extension, the content scripts of the first file to be included in the dynamic web page.

6. The one or more non-transitory computer-readable media of claim 1, wherein the web application comprises an Asynchronous JavaScript and XML (Ajax) application that is executable within a browser window.

7. A method comprising:
  under control of one or more computing devices configured with computer executable instructions,
  requesting, by a browser extension executing in a web browser, and to a file server, data associated with content scripts to be included in a dynamic web page operating in the web browser;
  instructing the file server to select a file from a file structure;
  receiving a response to the requesting, the response including the file that includes the content scripts; and
  using the response to include, by the browser extension executing in the web browser, at least part of the content scripts in the dynamic web page.

8. The method of claim 7, wherein the file server is operating on a device where the content scripts is located.

9. The method of claim 8, wherein the file server as a Node.js server.

10. The method of claim 9, wherein the Node.js server is located on a device remote from a device executing the web browser.

11. The method of claim 9, wherein the device upon which the Node.js server is located executes the web browser.

12. The method of claim 7, wherein the response further includes a second file that includes additional content scripts to be included in the dynamic web page.

13. The method of claim 7, further comprising loading a web application that operates the dynamic web page into the web browser, wherein the web application includes an Asynchronous JavaScript and XML (Ajax) application.

14. The method of claim 7, wherein the content scripts are JavaScript instructions.

15. The method of claim 7, wherein the dynamic web page is implemented by a web application.

16. One or more non-transitory computer-readable media storing computer-executable instructions executable by one or more processors to cause the one or more processors to:
  receive, by a file server and from a browser extension executing in a web browser, a request for data associated with content scripts to be included in a dynamic web page implemented by a web application;
  selecting a file from a file structure, the file including at least part of the content scripts;
  generate a response to the request, the response including the file that includes at least part of the content scripts; and
  send, to the browser extension, the response to the request.

17. The one or more non-transitory computer-readable media of claim 16, wherein the selecting comprises analyzing the file structure including one or more files, and the response is based at least in part on a result of the analyzing.

18. The one or more non-transitory computer-readable media of claim 17, wherein the instructions are further executable to:
  identify, using the file structure, the file.

19. The one or more non-transitory computer-readable media of claim 17, wherein the file structure is located on a device upon which the web application is operating.

20. The one or more non-transitory computer-readable media of claim 16, wherein the file server is a Node.js server.

21. A method comprising:
  under control of one or more computing devices configured with computer executable instructions,
  receiving, from a client device, a request to execute a hosted web application;
  requesting, by a browser extension executing in the hosted web application, data associated with content scripts to be included in a dynamic web page implemented by the hosted web application;
  instructing a file server to select a file from a file server;
  receiving a response to the requesting, the response including the file that includes the content scripts;
  using the response to include, by the browser extension executing in the hosted web application, at least part of the content scripts in the dynamic web page; and
  rendering the dynamic web page operating a hosted web application into a form to be provided to a client device.

22. The method of claim 21, wherein the content scripts include JavaScript instructions.

23. The method of claim 21, wherein the client device comprises a mobile device.

24. The method of claim 21, wherein the hosted web application is a test package version of the hosted web application.

* * * * *

UNITED STATES PATENT AND TRADEMARK OFFICE
CERTIFICATE OF CORRECTION

| | | |
|---|---|---|
| PATENT NO. | : 9,294,538 B1 | Page 1 of 1 |
| APPLICATION NO. | : 13/765400 | |
| DATED | : March 22, 2016 | |
| INVENTOR(S) | : Rajesh Kumar Rana et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 317 days.

Signed and Sealed this
Fourteenth Day of June, 2016

Michelle K. Lee
*Director of the United States Patent and Trademark Office*